United States Patent
Millet et al.

(10) Patent No.: US 12,508,141 B2
(45) Date of Patent: Dec. 30, 2025

(54) RESTING ORTHOSIS FOR A JOINT

(71) Applicant: MILLET INNOVATION, Loriol sur Drome (FR)

(72) Inventors: Damien Millet, Valence (FR); Hugo Laurent, Valence (FR); Odile Grange, Allex (FR); Maria Luisa Trepier-Le Beller, Portes-les-Valence (FR); Océane Martin, Loriol sur Drome (FR); Thierry Fontaine, Marsanne (FR)

(73) Assignee: MILLET INNOVATION, Loriol sur Drome (FR)

( * ) Notice: Subject to any disclaimer, the term of this patent is extended or adjusted under 35 U.S.C. 154(b) by 881 days.

(21) Appl. No.: 16/956,979

(22) PCT Filed: Dec. 12, 2018

(86) PCT No.: PCT/FR2018/053227
§ 371 (c)(1),
(2) Date: Jun. 22, 2020

(87) PCT Pub. No.: WO2019/122610
PCT Pub. Date: Jun. 27, 2019

(65) Prior Publication Data
US 2021/0369480 A1    Dec. 2, 2021

(30) Foreign Application Priority Data
Dec. 21, 2017  (FR) ...................................... 1762847

(51) Int. Cl.
*A61F 5/01* (2006.01)
*A61F 5/058* (2006.01)
(Continued)

(52) U.S. Cl.
CPC ........ *A61F 5/0118* (2013.01); *A61F 5/05866* (2013.01); *B33Y 80/00* (2014.12); *A61F 13/107* (2013.01)

(58) Field of Classification Search
CPC .. A61F 5/0118; A61F 5/05866; A61F 13/107; A61F 2005/0197; A61F 5/0104;
(Continued)

(56) References Cited

U.S. PATENT DOCUMENTS

| | | | |
|---|---|---|---|
| 5,397,296 A | 3/1995 | Sydor et al. |
| 5,807,293 A | 9/1998 | Wedge, Jr. |

(Continued)

OTHER PUBLICATIONS

Omnexus, "Modulus of Elasticity," https://omnexus.specialchem.com/polymer-properties/properties/young-modulus#:~:text=The%20modulus%20of%20elasticity%20of%20nylon,GPa%20(0.4%20x%20106%20psi).*

(Continued)

*Primary Examiner* — Victoria Hicks Fisher

(57) ABSTRACT

An orthosis for support of a joint, adapted to the thumb or wrist, having sleeve-like main member made of an elastic material, adapted to envelop the joint and distal and proximal limb portions on either side of the joint, elastically deformable panel housed in a pocket formed in the main member, and non-elastic bracing device for bracing the main member and a proximal portion of the panel around the proximal limb portion, the panel being configured such that, over at least 50 % of the length of the main member along the limb portions, including a limb portion covered by the bracing device, the panel has a cross-section occupying more than 30 % of the perimeter of the underlying limb, the panel having a stiffness defined by a Young's modulus between S and 10 MPa, while the material forming the main member has a stiffness of a lower order of magnitude.

18 Claims, 8 Drawing Sheets

Figure 1:
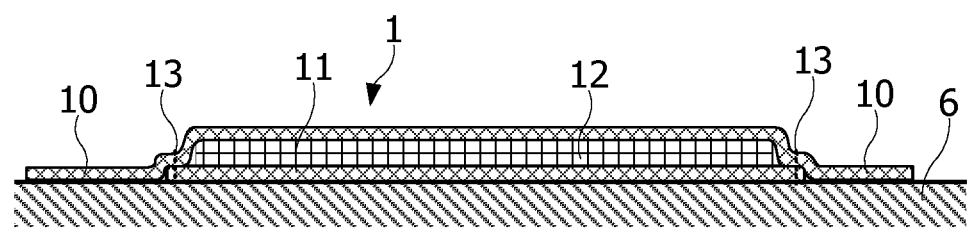

(51) Int. Cl.
*B33Y 80/00* (2015.01)
*A61F 13/10* (2006.01)

(58) Field of Classification Search
CPC ...... A61F 5/0102; A61F 5/01; A61F 5/05858; A61F 5/05841; A61F 5/058; A61F 5/05; A61F 5/04; A61F 13/10; A61F 5/00; A61F 5/3723; A61F 5/37; A61F 5/05833; A61F 5/05891; A61F 5/10; A61F 5/0585; A41D 19/01582; A63B 71/14; A63B 71/141; A63B 71/143; A63B 71/145; A63B 71/146; A63B 71/148
USPC .......................................................... 602/21
See application file for complete search history.

(56) References Cited

U.S. PATENT DOCUMENTS

| | | | | |
|---|---|---|---|---|
| 6,322,462 | B1* | 11/2001 | Kafer | A63B 69/0059 |
| | | | | 473/214 |
| 6,716,185 | B1 | 4/2004 | Rieger | |
| 9,782,285 | B1* | 10/2017 | Weber | A61F 5/0118 |
| 2005/0165338 | A1 | 7/2005 | Iglesias et al. | |
| 2008/0104737 | A1* | 5/2008 | Shepherd | A61F 5/0118 |
| | | | | 2/161.1 |
| 2010/0081981 | A1 | 4/2010 | Cheng | |
| 2016/0206464 | A1* | 7/2016 | Grange | A61F 5/0118 |
| 2016/0296357 | A1* | 10/2016 | Westover | A61F 5/0104 |
| 2017/0258624 | A1* | 9/2017 | Butler | A61F 5/05866 |
| 2017/0354528 | A1* | 12/2017 | Lane | A61F 5/01 |

OTHER PUBLICATIONS material-properties.org, "Polyvinyl Chloride," https://material-properties.org/polyvinyl-chloride-properties-application-price/.*

* cited by examiner

RESTING ORTHOSIS FOR A JOINT

The present invention relates to a resting orthosis for a joint and more particularly for a thumb or wrist joint.

For many years, orthoses have been developed for accidental pathologies, and more recently for pathologies related to ageing. In the case of accidental pathologies, the aim is generally to immobilize a limb or a joint. In the case of age-related pathologies or benign accidental pathologies, the aim is rather to ensure simple support of the limb or joint, in the absence of muscular solicitation, without preventing voluntary movements.

Most orthoses adapted to a limb or a joint are made by combining knitted fabrics with rigid elements, for example made of steel or plastic. These orthoses have the disadvantage of being relatively uncomfortable due to their weight and size. These orthoses therefore appear unsuitable for simply holding a limb or joint for long periods of time.

In the case of people with rhizarthrosis or Quervain's tendonitis, it is generally prescribed to rest the trapezoid-metacarpal joint of the thumb to prevent long-term deterioration of symptoms and to relieve pain. However, even if the thumb is not consciously used, the weight of the thumb itself causes activity in the joint.

The Applicant has developed more comfortable and lightweight orthoses, described in patent application WO 2015/28734 (US 2016/206464). These orthoses include a piece of fabric surrounding the thumb joint, the rigidity of which is increased by a beam effect, to prevent involuntary movements, without imposing additional efforts to perform voluntary movements.

However, there are other conditions that may cause a limitation of movement in either of the hand and wrist joints. For example, in the case of carpal tunnel syndrome, repeated bending of the wrist can lead to pain. In the resting state, the weight of the hand alone often causes the wrist to flex involuntarily. It is therefore advisable to keep the wrist in a resting position, especially during sleep. Also, in the case of musculoskeletal disorders affecting the thumb and wrist, it may be advisable to keep all the joints concerned at rest. It turns out that the piece of fabric used to hold the thumb has insufficient rigidity, even using a beam effect, to support the weight of the hand and thus hold the wrist.

The Applicant has also proposed orthoses incorporating rigid thermoformable panels, described in patent application WO 2016/198778. These orthoses provide a very effective support, adapted to the morphology of the user. However, this support may appear excessive for certain pathologies, particularly at night, and thus be a source of discomfort. These orthoses also have the disadvantage of requiring a thermoforming operation. In addition, it may be necessary to avoid pressure in a specific area. This is particularly the case for people with carpal tunnel pathology. The thermoforming operation then requires the use of a part to be placed on the area to be protected from pressure during the thermoforming operation, so as to leave a space between this area and the thermoformable panel, the orthosis then being used without this part.

It is therefore desirable to provide a resting orthosis for a joint, such as the hand and/or wrist, capable of supporting the weight of the distal part of the limb from the joint, without causing discomfort, even if the orthosis is worn for long periods of time. It may also be desirable to provide an orthosis that does not need to be custom-made, but only in a few standard sizes, and without the need for a final adjustment operation. It may also be desirable to provide an orthosis that does not impede the movement of the joint.

Embodiments relate to an orthosis for supporting a joint, adapted to the thumb and/or the wrist, comprising: a sleeve-like main member of an elastic material, and adapted to envelop the joint and distal and proximal limb portions on either side of the joint, the main member having an opening for the passage of a proximal limb portion and an opening for the passage of a distal limb portion, an elastically deformable panel housed in a pocket formed in the main member and adjusted to the dimensions of the panel, and a rigid bracing device for bracing the main member and a proximal portion of the panel around the proximal limb portion, a distal portion of the panel being held around the limb only by the main member, wherein the panel is configured so that, over at least 50% of the length of the main member along the limb portions, including a limb portion covered by the bracing device, the panel has a cross-section occupying more than 30% of the perimeter of the underlying limb, the panel being made of a material having a Young's modulus between 5 and 10 MPa, while the material forming the main member has a rigidity of a lower order of magnitude.

According to an embodiment, the extent and thickness of the panel, and the elasticity of the panel and the main member are selected so as to prevent unintentional movements of the joint from a neutral rest position due to the weight of the distal limb part.

According to an embodiment, the panel extends over at least 80% of the length of the orthosis along the limb, and the cross-section of the panel occupies more than 40% of the perimeter of the underlying limb over at least 80% of the length of the panel along the limb.

According to an embodiment, the panel comprises two panel parts joined together by a hinge extending along part of facing edges of the two panel parts.

According to an embodiment, the hinge is made during the manufacture of the panel from the same material as the panel or is formed by stitches.

According to an embodiment, the hinge extends over less than half the length of the facing edges of the two panel portions.

According to an embodiment, the bracing device partly covers the hinge.

According to an embodiment, the orthosis comprises two panels housed in distinct and contiguous pockets.

According to an embodiment, each panel is made by one of the following operations: injection molding, thermoforming of a sheet using a hot press, 3D printing.

According to an embodiment, the main member is made of fabric including two elastic fabric layers joined together by an adhesive layer, each pocket being formed by means of an elastic fabric layer sewn onto an inner side of the main member.

According to an embodiment, the panel has a Young's modulus between 5.4 and 9 MPa at a thickness between 0.8 and 1.9 mm.

According to an embodiment, the orthosis is adapted to support the thumb, wherein the main member includes a distal sleeve-like part shaped to cover the base of the thumb, a proximal sleeve-like part shaped to cover the wrist, and an intermediate part connecting the distal and proximal parts, the panel comprising two panel parts shaped to conform to the shape of the thumb, the first phalanx and the first metacarpal of the thumb, up to the wrist, without covering the palmar area of the wrist, the bracing device comprising a strap attached to the main member and configured to be tightened around the wrist.

According to an embodiment, the orthosis is adapted to support the wrist, wherein the sleeve-like main member is shaped to cover a portion of the forearm, the wrist and the carpo-metacarpal joints of the thumb and a proximal portion of the metacarpals of the fingers, the main member having a proximal opening for passage of the forearm and two distal openings, one for passage of the thumb, and the other for the passage of the palm of the hand, the panel comprising two panel parts shaped to conform to the base of the palm of the hand, the metacarpal region of the thumb, and the palmar surface of the wrist, and part of the forearm, extending up along the side faces of the hand, wrist and forearm, the bracing device being configured to brace the main member around the wrist and forearm.

According to an embodiment, the orthosis is adapted to support the wrist and thumb, wherein the main member includes a distal sleeve-like part shaped to cover the base of the thumb, a proximal sleeve-like part shaped to cover the wrist and part of the forearm and the carpo-metacarpal joints of the thumb, and an intermediate part connecting the distal and proximal parts, the panel including two panel parts shaped to conform to the shape of the thumb, the first phalanx and the region of the first metacarpal of the thumb, the base of the palm of the hand, and the palmar surface of the wrist, and part of the forearm, extending up along the side faces of the hand, wrist and forearm, the bracing device being configured to brace the main member around the wrist and forearm.

According to an embodiment, one of the two panel parts is shaped to avoid contact with the carpal tunnel region on the palmar surface of the wrist.

Figure 2:
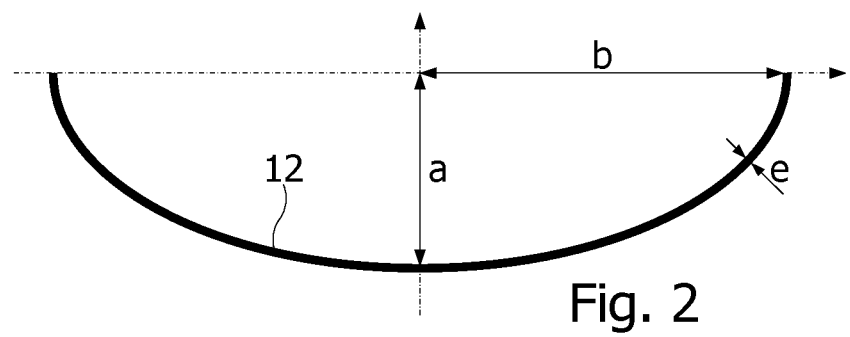
Figure 3:
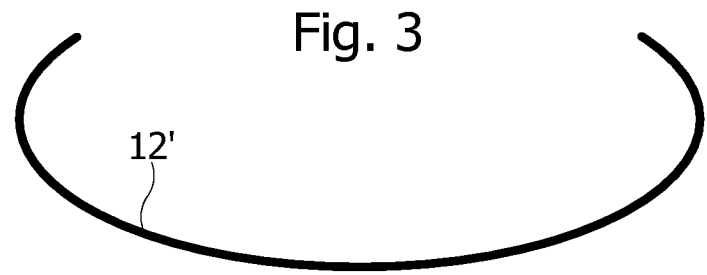
Figure 4:
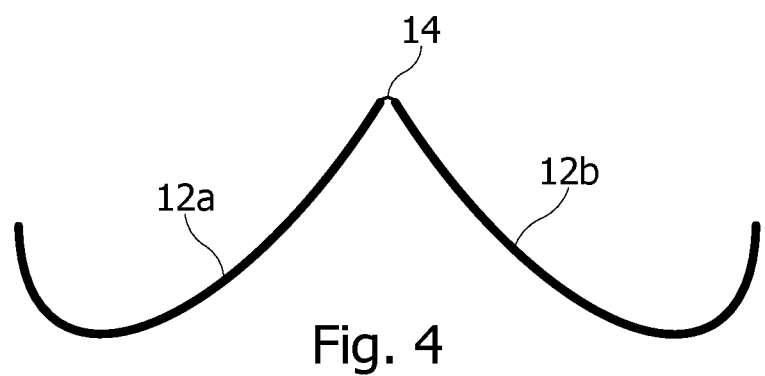
Figure 5:
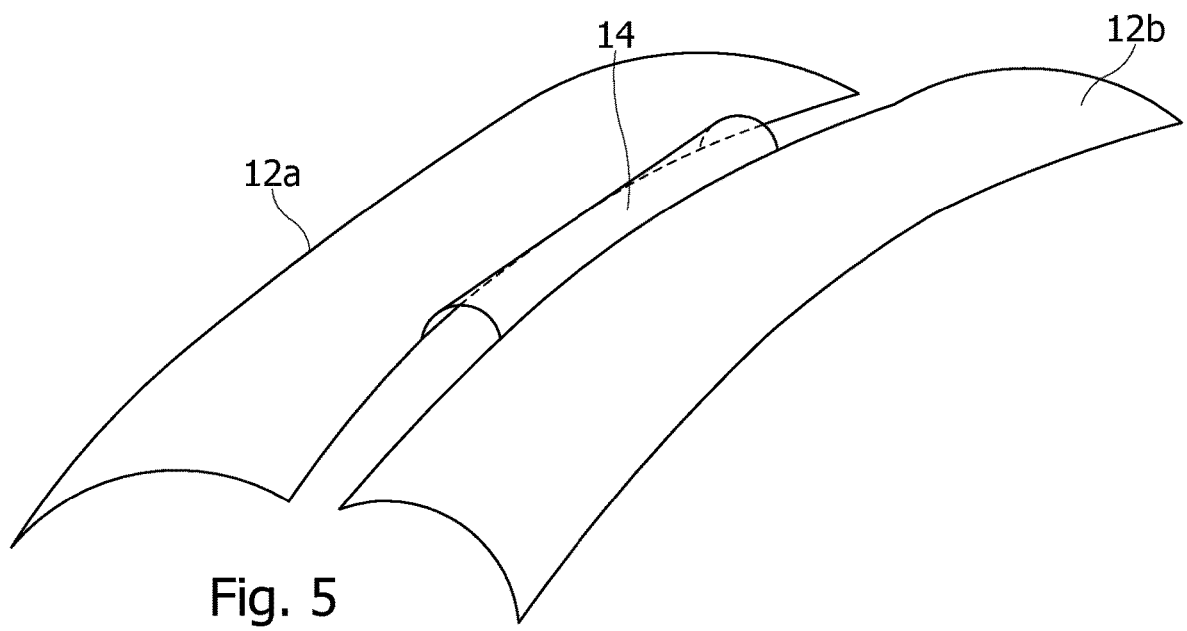
Figure 6:
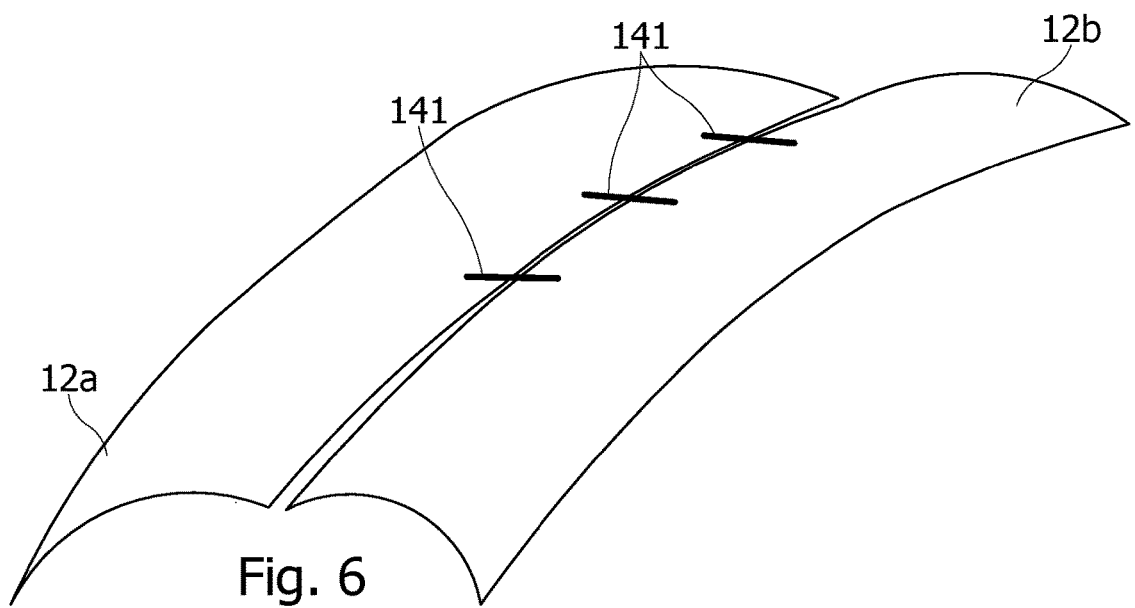
Figure 7:
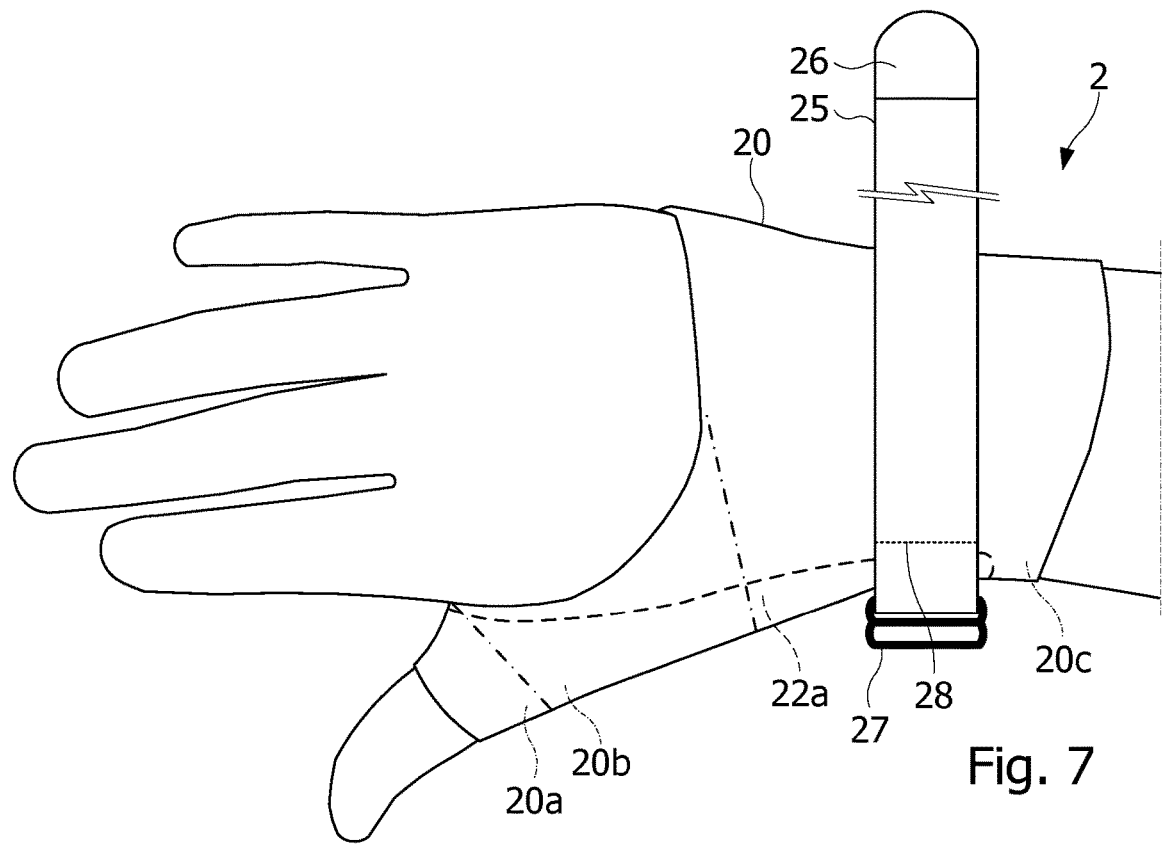
Figure 8:
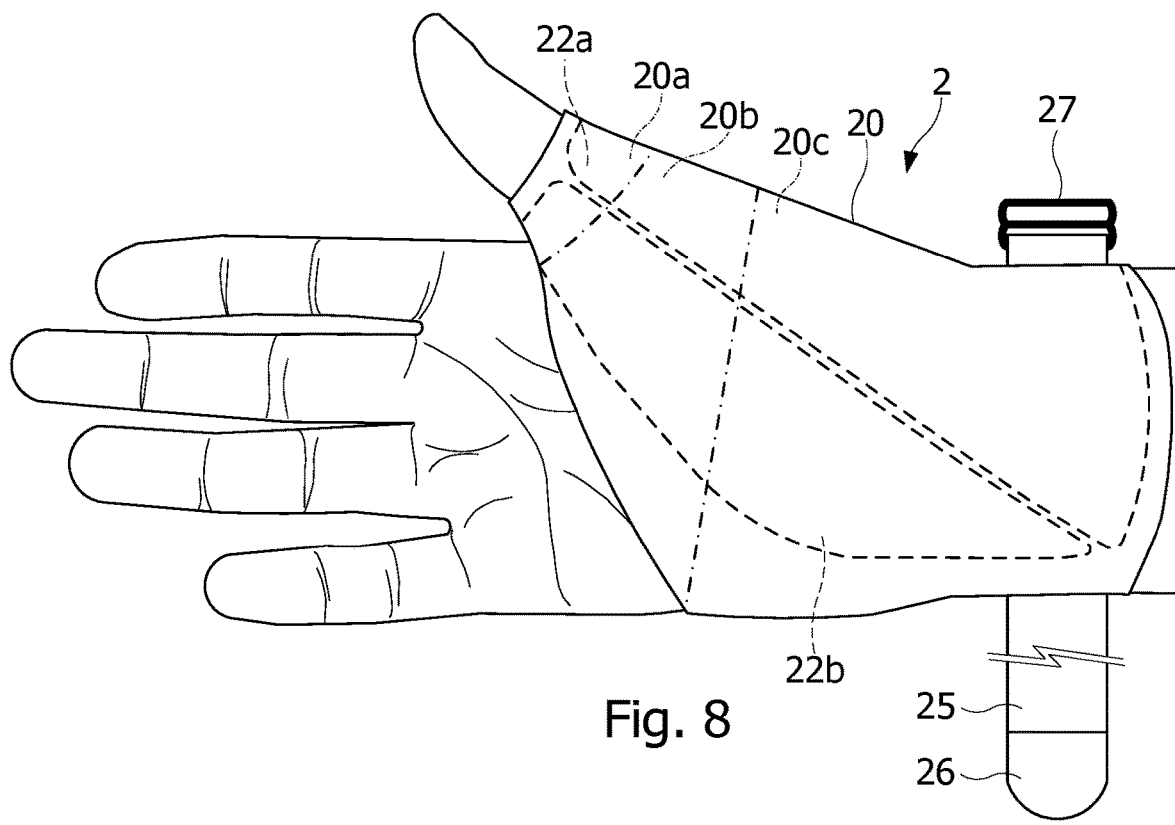
Figure 9:
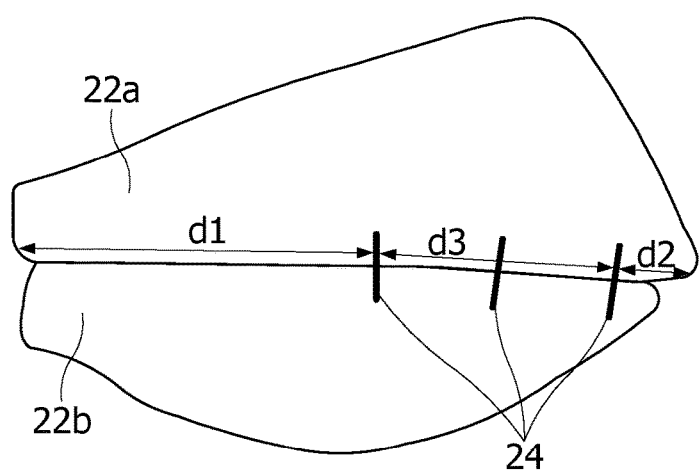
Figure 9A:
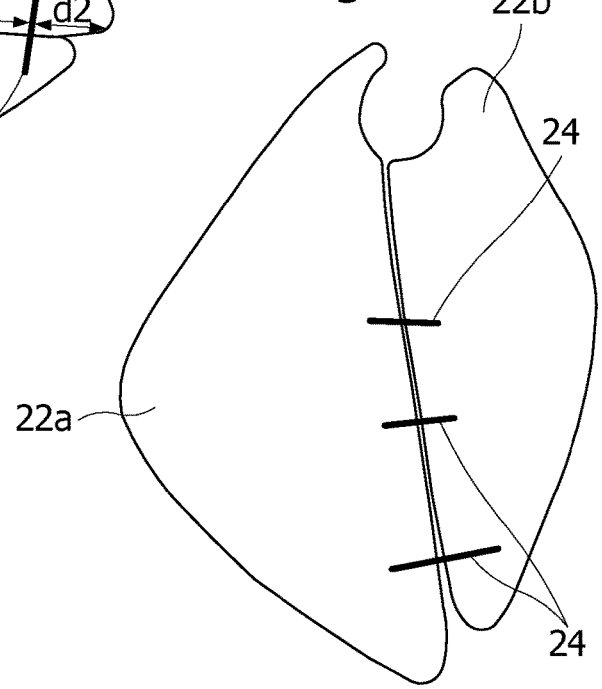
Figure 10:
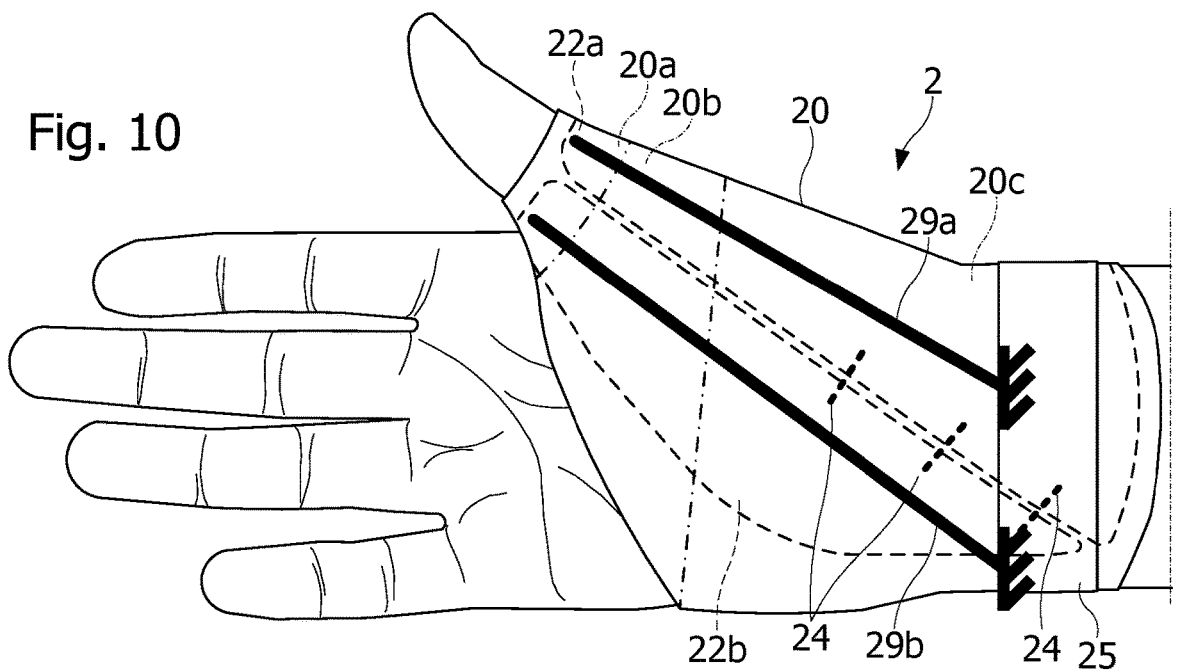
Figure 11:
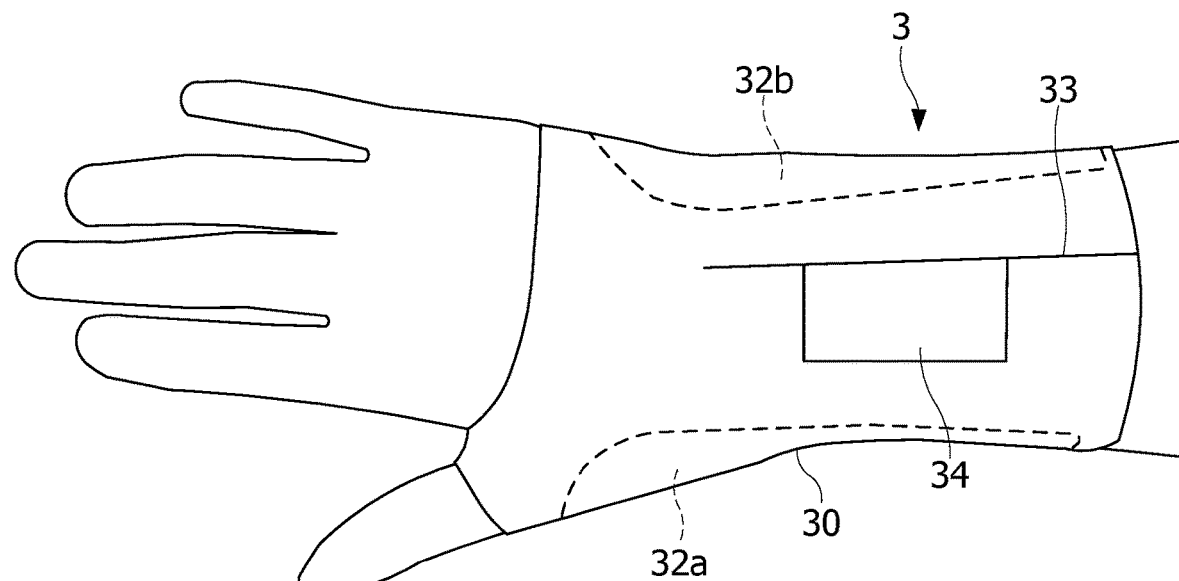
Figure 12:
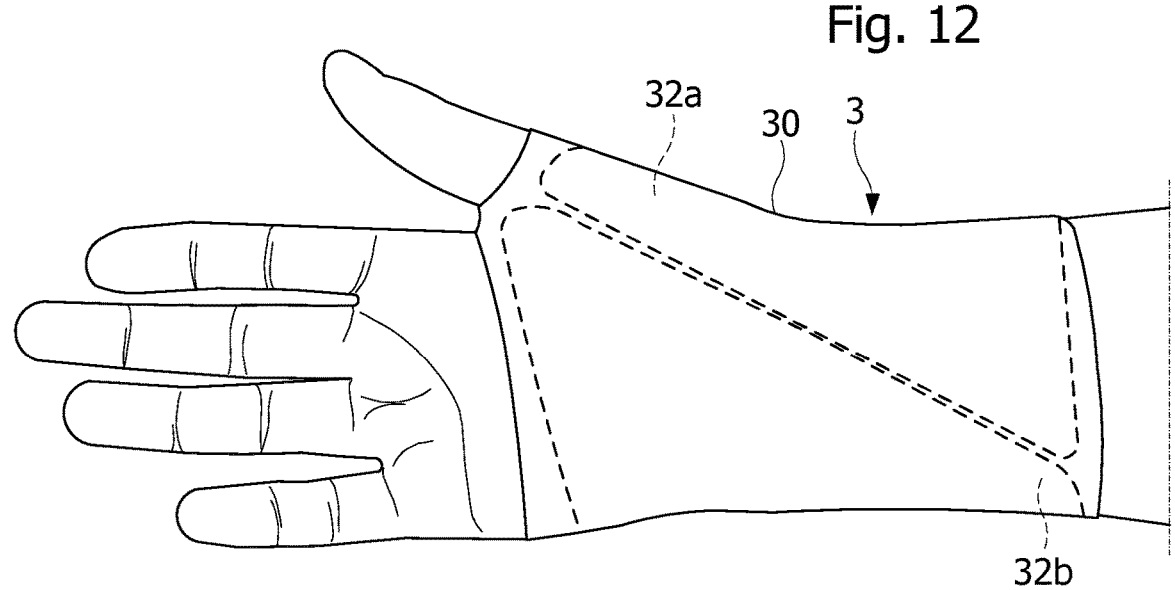
Figure 13:
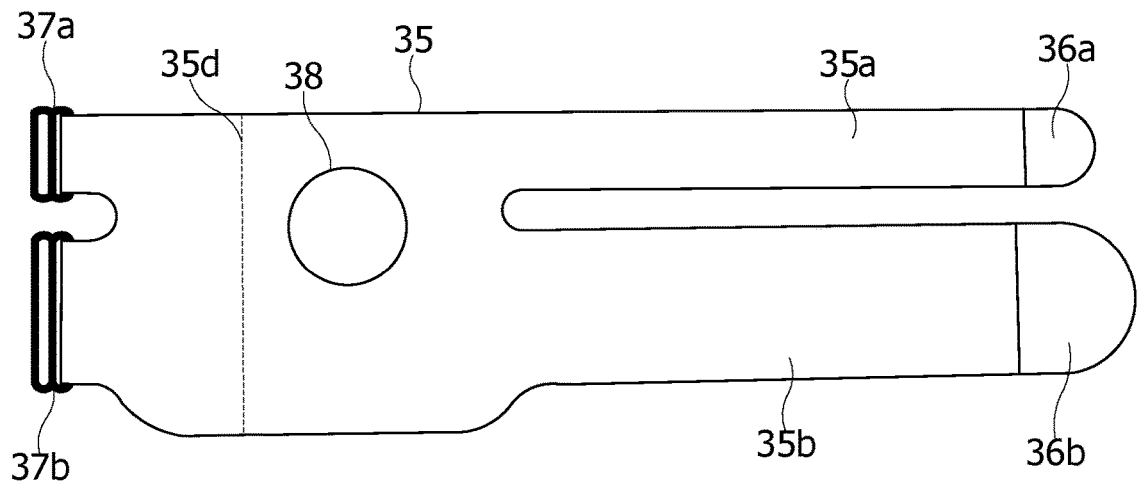
Figure 14:
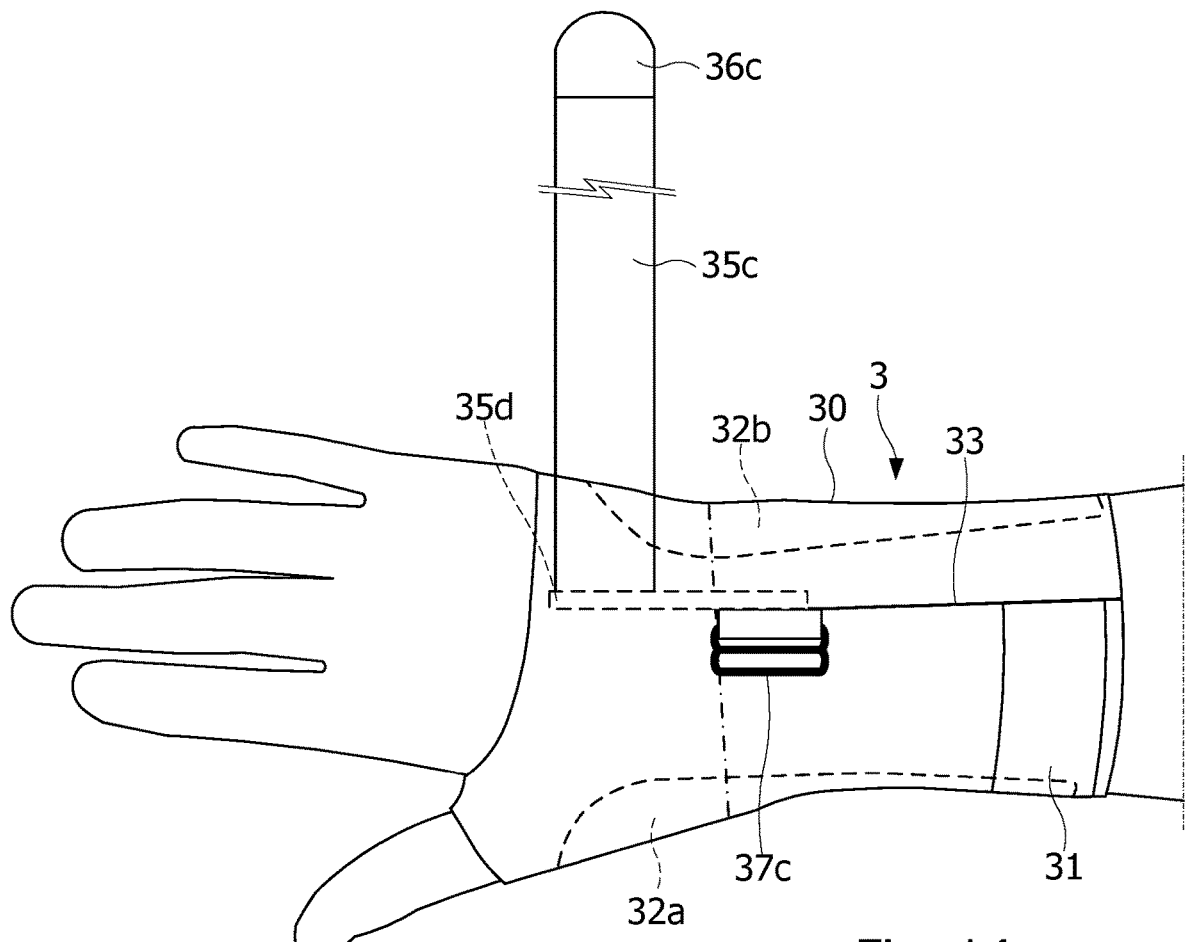
Figure 15:
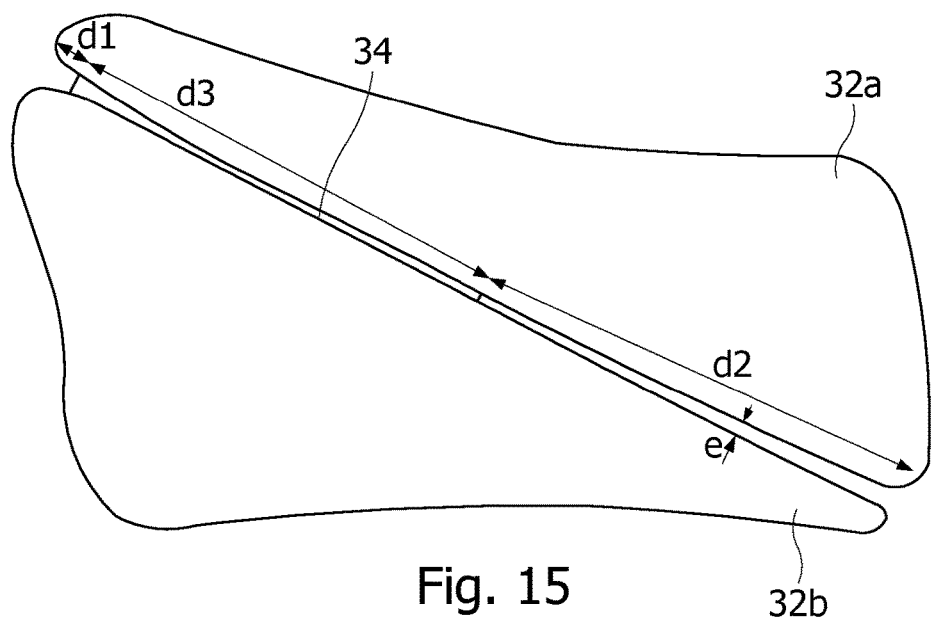
Figure 16:
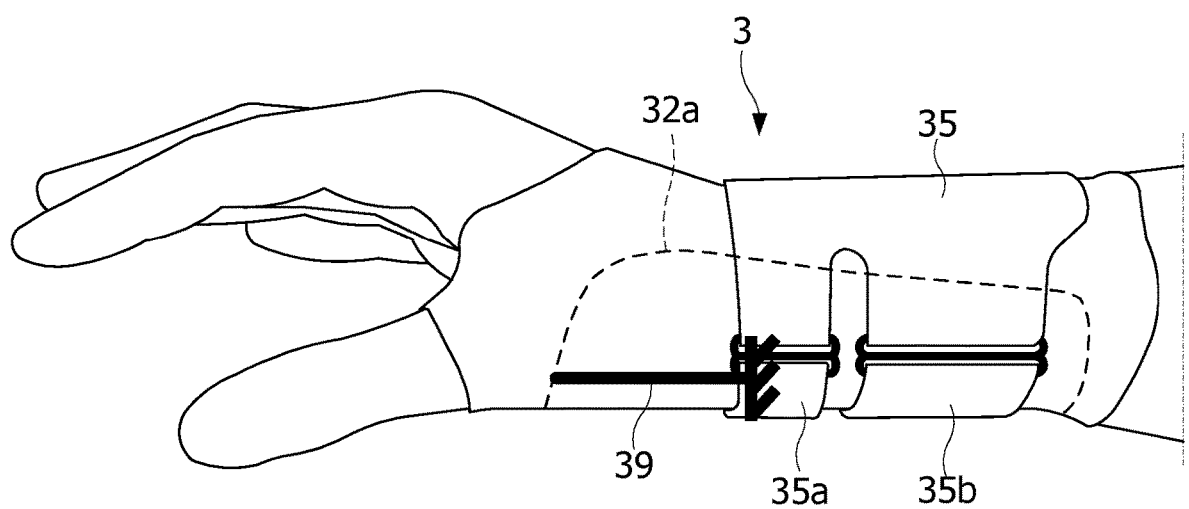
Figure 17:
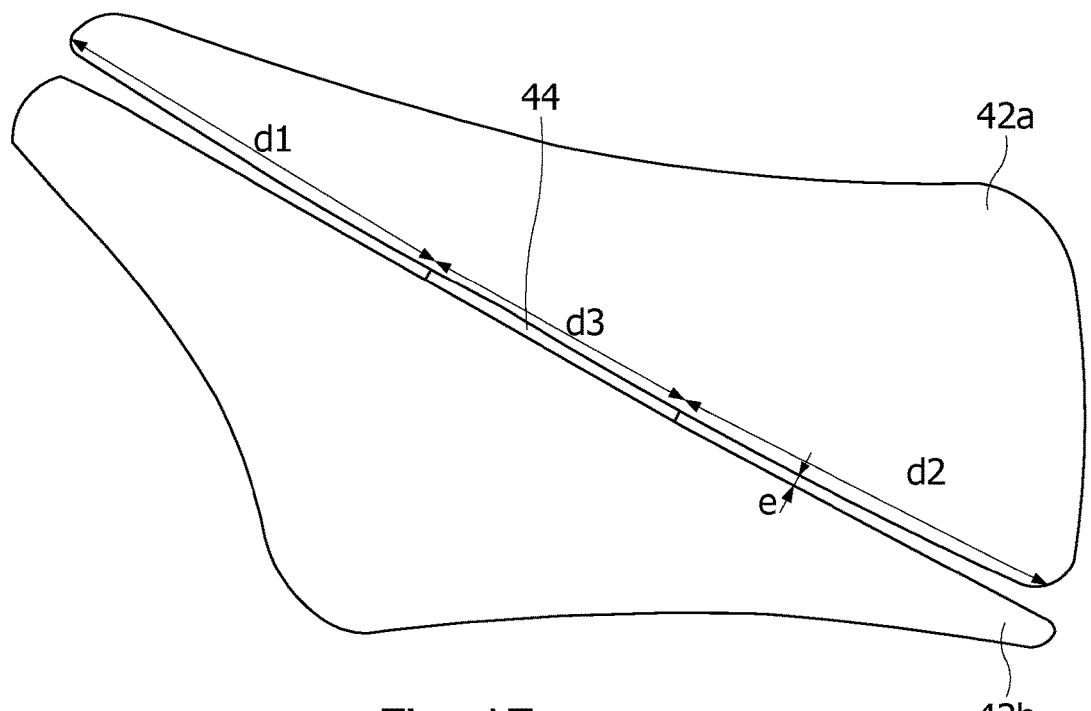
Figure 18:
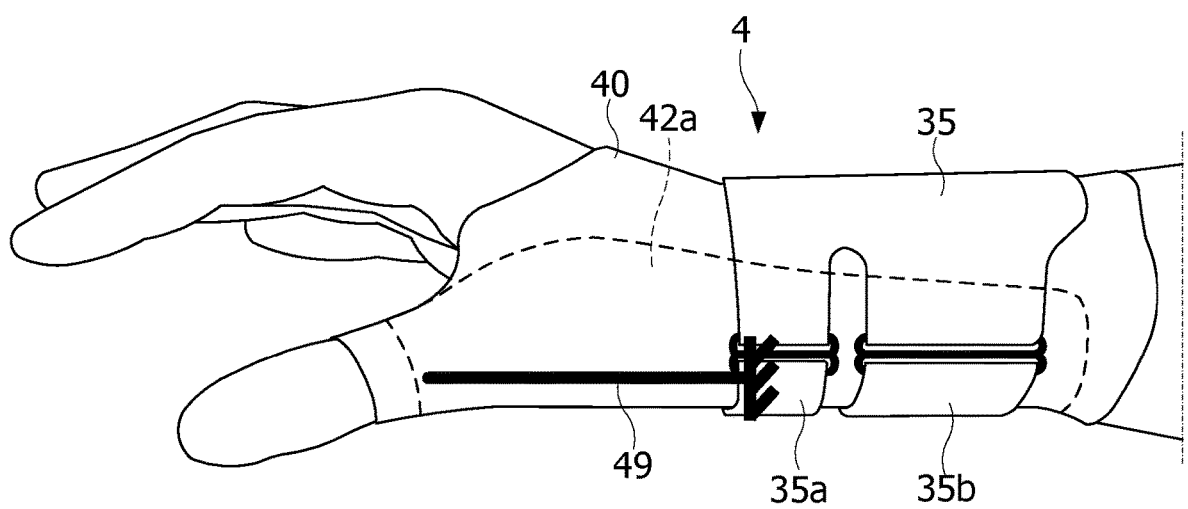

Embodiments of the invention will be described in the following, on a non-limitative basis in relation to the attached figures, among which:

FIG. 1 illustrates a schematic cross-section of a part of an orthosis according to an embodiment, FIGS. 2 to 4 illustrate schematic cross-sectional views of flexible, molded panels housed in a pocket formed in the orthosis, according to various embodiments, FIGS. 5 and 6 illustrate schematic perspective views of pairs of articulated panels, according to different embodiments, FIGS. 7 and 8 illustrate top and bottom schematic views of a hand equipped with a thumb orthosis according to an embodiment, FIGS. 9 and 9A illustrate two opposite sides of a pair of panels fitted to the orthosis of FIG. 7, in front and perspective view respectively, according to an embodiment, FIG. 10 illustrates a schematic view of the orthosis of FIG. 8, showing an effect obtained by the pair of panels of FIG. 9, according to an embodiment, FIGS. 11 and 12 illustrate top and bottom schematic views of a hand equipped with a wrist orthosis according to an embodiment, FIG. 13 schematically illustrates a bracing device for the orthosis of FIG. 11, according to an embodiment, FIG. 14 schematically illustrates the orthosis of FIG. 11 fitted with a bracing strap according to another embodiment, FIG. 15 schematically shows a pair of panels fitted to the orthosis of FIG. 11, according to an embodiment, FIG. 16 illustrates a schematic side view of the orthosis of FIG. 11, showing an effect obtained by the pair of panels of FIG. 15, according to an embodiment, FIG. 17 schematically illustrates a pair of panels fitted to a wrist and thumb orthosis, according to an embodiment, FIG. 18 illustrates a schematic side view of a wrist and thumb orthosis, according to an embodiment.

FIG. 1 partially shows an orthosis 1 according to an embodiment. The orthosis 1 comprises two members 10, 11. Member 10 is at least partially elastic and shaped to form a sleeve fitted around a joint to be held. Thus, the sleeve can exert on the joint and/or the underlying limb a tension comparable to, or less than that exerted by the most commonly used retaining devices. Member 11 is made of an elastic material and attached to member 10 so as to form a pocket in which a panel 12, made of an elastically deformable material, is housed. The shape of the pocket is adjusted to the shape of panel 12. Thus the filling rate of the pocket by the panel may be between 80 and 95%. The shape of the panel 12 can be defined according to the area of the limb or joint where support is required. Member 10 can be placed in direct contact with the skin 6 of the limb. Member 11 can be attached to member 10 by a weld or seam line 13, on the side of member 10 in contact with the skin 6. This means that member 11 is also in contact with the skin 6 of the limb.

According to an embodiment, panel 12 is shaped so as to envelop, and conform at least partially to the joint area to which it is to be applied. For example, panel 12 may be shaped to partially envelop the joint by applying it to areas of the joint that need to be maintained, and by leaving a space between the orthosis and the skin of the limb in sensitive areas where it is preferable not to apply pressure.

The orthosis also includes a non-elastic device for bracing the main member and a proximal part of the panel around the proximal limb portion. Thus, the panel in combination with the bracing device forms a cantilever beam, when the bracing device is adjusted around the limb, even at zero or low tension, which simply allows the length of the bracing device to be adjusted to the perimeter of the underlying limb. The panel is also configured so that, for at least 50% of the length of the orthosis along the limb portions covered by the orthosis, including the limb portion covered by the bracing device, the panel has a cross-section occupying more than 30% of the perimeter of the underlying limb. In addition, the extent and thickness of the panel, and the elasticity of the panel and the main member are chosen so as to prevent unintentional movements of the joint from a neutral resting position, due to the weight of the distal part of the limb. As a result, whatever the orientation of the distal part of the limb, the orthosis alone can ensure that this part is maintained in its neutral position.

Preferably, the panel extends over at least 80% of the length of the orthosis along the limb, and the section of the panel occupies more than 40% of the perimeter of the underlying limb over at least 80% of the length of the panel along the limb.

According to an embodiment, the extent and thickness of the panel, as well as the elasticity of the panel and the main member are chosen to allow voluntary movements of the joint.

Panel 12 can be produced by molding from an injectable plastic material, or by thermoforming a flat sheet using a hot press, or by 3D printing. The thickness of the panel 12 may be variable so that it is thicker in areas where the panel 12 should be stiffer to provide a certain hold, and thinner in areas where the panel 12 may be more compliant to provide a less firm hold or to form a hinge between two parts of the panel. The elasticity of the material (Young's modulus) forming the panel 12 is selected in accordance with the desired rigidity and the shape, and in particular the curvature, of the panel.

FIG. 2 shows an exemplary section of a panel 12 that can be fitted to the orthosis according to the invention. The panel section shown in FIG. 2 has a semi-elliptical shape, with depth a, half width b and thickness e. The bending of a beam having this section is inversely proportional to the Young's modulus, to the cube of depth a and to the half-width b. Of course, the panel section shape shown in FIG. 2 is an ideal shape that does not correspond to the actual cross-section of a joint or limb.

In some cases, it may be desirable for the panel to surround the joint over a larger extent in some locations. Thus, FIG. 3 shows a panel section 12' extending over an angular sector greater than 180°. It happens that the panel 12' cannot be manufactured using a simple mold without an undercut. According to an embodiment, such a panel is made in two parts as shown in FIG. 4. FIG. 4 shows the sections of a pair of panels 12a, 12b that can be hinged together by a hinge 14 to form a panel having the section of the panel 12'. The pair of panels 12a, 12b can be manufactured in a single molding operation using a single mold (without undercuts).

FIGS. 5 and 6 show examples of hinged pairs of panels 12a, 12b. In the example shown in FIG. 5, the hinge 14 is formed together with the panels 12a, 12b in the molding operation, and is therefore in the same material as the panels. Hinge 14 has a substantially cylindrical shape (defined by a straight generatrix) and may have a smaller thickness than the panels 12a, 12b, to allow bending by elastic deformation. Indeed, to ensure its function, hinge 14 should not flex, even if panels 12a, 12b flex to fit part of a limb.

In the example of FIG. 6, the hinge is made by stitches 141, e.g. 3 stitches.

According to an embodiment, the hinge 14, 141 extends over only part of the face-to-face edges the two panels 12a, 12b. Indeed, there is little variation in joint dimensions between adult individuals. On the other hand, large morphological variations in dimension can be observed in the regions on either side of the joints. It is therefore advantageous not to hinge the panels 12a, 12b together over a portion of the opposing edges of the two panels 12a, 12b. Due to the flexibility of panels 12a, 12b, the panels can be deformed and conform to the user's morphology in the areas that have no hinge connection. In the hinge-connected areas, however, the two panels 12a, 12b together have a stiffness close to that of a single panel having the shape of the two connected panels 12a, 12b.

Alternatively, the two panels 12a, 12b are simply housed in respective pockets of the orthosis without being hinged together, especially when less stiffness is required and/or when the material chosen for the panels has sufficient stiffness. The two panels 12a, 12b may also be housed in a single pocket separated in half by, for example, a seam in the gap between the facing edges of the two panels.

According to an embodiment, the material in which member 10 is formed is made of two layers of elastic fabric, joined together by a layer of adhesive. The layer of adhesive may be evenly distributed between the two layers of fabric, or it can be arranged in evenly distributed points. The two layers of fabric may be glued together by coating one of the two layers with glue and pressing the two layers together by means of one or two rollers. The adhesive layer may be about 0.05 mm thick.

The fabric forming the two layers of member 10 may be a fabric based on polyamide (approx. 80% by weight) and elastane (approx. 20% by weight), having a grammage of 155 g/m2. The adhesive used may be polyurethane-based. The overall material formed by the two layers of fabric and the adhesive layer may have a grammage of 355 g/m2. The fabric forming the two layers may be between 0.5 and 0.7 mm thick. As a result, the material from which member 10 is formed may be between 1 and 1.4 mm thick. The fabric forming each of the two bonded layers may have an elasticity between 85% and 115% in the warp direction and between 65% and 95% in the weft direction. Member 11 assembled on layer 10 to form the pocket may be made by a single layer of the same fabric.

To limit the risk of perspiration, the members 10 and 11 may also have micro-perforations.

According to an example, the panel(s) may be made of a thermoplastic elastomer, and may have a Young's modulus (in the absence of stretching) between 5 and 10 MPa for a thickness between 0.7 and 2 mm. Preferably, the Young's modulus of the panel(s) is between 5.4 and 9 MPa for a thickness between 0.8 and 1.9 mm.

FIGS. 7 and 8 illustrate a thumb orthosis 2 according to an embodiment, with the orthosis placed on a hand. FIGS. 7 and 8 show the dorsal and palmar sides of the hand, respectively. The orthosis 2 comprises a main member 20 having a distal part 20a, a proximal part 20c, and an intermediate part 20b connecting parts 20a and 20c, delimited in FIGS. 7 and 8 by dot-and-dash lines. Part 20a, in the form of a sleeve, is shaped to cover and hold the base of the thumb from the fold area between the thumb and the palm of the hand to the middle of the first phalanx of the thumb. Part 20c, also sleeve-shaped, is shaped to cover the wrist, the carpo-metacarpal joints of the thumb, and a proximal portion of the metacarpals of the fingers. The intermediate part 20c has an opening extending between parts 20a and 20c, for the passage of the palm of the hand.

The main member 20 is made of elastic material and is adjusted to the shape of the hand and thumb to be held, without exerting too much compression force, which can cause pain, especially in the sensitive area of the carpo-metacarpal joints. The main member 20 can thus be made of the same material as member 10 (FIG. 1). The orthosis also includes a non-elastic tightening strap 25, which is arranged to tighten the main member 20 around the wrist. The strap 25 can be attached to the main member 20, for example by means of a seam 28. The tightness of the strap can be adjusted by means of a section with loops on one side of the strap and a section with hooks 26 attached to the free end of the strap. In an embodiment, one end of the strap has a buckle 27 in which the other end of the strap is engaged after being wound in one direction around the wrist. The strap is then tightened around the wrist in the other direction, the hook section 26 at the other end of the strap being applied to the loop section of the strap. The orthosis can be removed in the direction of the fingertips and thumb without great effort, particularly because there are no strangling areas.

According to an embodiment, the main member 20 comprises a pocket in which are housed panels 22a, 22b linked together by one or more hinges. The panels 22a, 22b are molded to fit the thumb, first phalanx and first metacarpal, up to the wrist. Thus, a proximal portion of panels 22a, 22b is located in the area tightened by strap 25.

FIGS. 9 and 9A show panels 22a, 22b joined together by three seams 24. Panels 22a, 22b together have an enveloping shape, surrounding more than 80% of the circumference of the first phalanx. This enveloping shape has a depth (dimension "a" in FIG. 2) which contributes to increasing the quadratic moment of the panels, and thus, by beam effect, to increasing the rigidity of the panels to support the weight of the thumb. As shown in FIG. 10, some of the panels are located under strap 25. Panels 22a, 22b thus behave like cantilever beams 29a, 29b, when strap 25 is tightened around the wrist, the tightening by strap 25 of part of the panels 22a, 22b producing a cantilever effect. This cantilever effect is increased by the fact that the strap is not elastic. Thus, the enveloping shape of panels 22a, 22b, combined with the rigidity of the material chosen to form the panels, ensures that the metacarpophalangeal joint of the thumb is maintained in the rest position. The rigidity of the material forming the panels is chosen so as to prevent involuntary movements of the joint from the neutral resting position of the thumb (in the absence of external force and muscle contraction), due to the weight of the thumb, regardless of the orientation of the hand in space, without however preventing voluntary movements of the thumb.

It can be seen in FIG. 10 that part of the hinge 24 is covered by the bracing strap 25, which contributes to the rigidity of the orthosis. It can also be observed that hinge 24 extends only over part of the facing edges of the two panels 22a, 22b. A distal part d1 (FIG. 9) without hinge allows the orthosis to adapt to the different morphologies of the metacarpophalangeal joint region of the thumb. Indeed, the absence of a hinge in this area allows the panels to move away from or towards each other, as well as to deform more significantly than if these parts were linked. This arrangement combined with the flexibility of panels 22a, 22b allows the same panels to be used for different sizes of the orthosis, thus allowing the use of a single mold for the manufacture of orthoses of different sizes. The presence of the hinge 24 connecting the two panels 22a, 22b in the area d3 allows for a deeper combined profile (dimension "a" in FIG. 2). The quadratic moment obtained by the combination of the two panels is therefore slightly higher in this zone.

According to an embodiment, the distance d1 is set to a value between 60 and 65 mm, the length d3 of the hinge is set to a value between 35 and 45 mm, and the distance d2 between the hinge and the proximal edge of the panel 22a is set to a value between 10 and 15 mm.

In another embodiment, panels 22a, 22b are not linked together by a hinge, but are housed in two separate pockets or a single pocket divided in two, for example by a separating seam between the two panels.

FIGS. 11 and 12 illustrate a wrist orthosis 3, according to an embodiment, with the orthosis placed on a hand. FIGS. 11 and 12 show the dorsal and palmar sides of the hand, respectively. Orthosis 3 comprises a sleeve-shaped main member 30, covering part of the forearm, the wrist and the carpo-metacarpal joints of the thumb, and a proximal part of the metacarpals of the fingers. The main member 30 has a proximal opening for the passage of the forearm and two distal openings, one for the passage of the thumb and the other for the passage of the palm of the hand. The main member 30 has a slot 33 extending from the proximal opening to a central region of the dorsal side of the hand to allow passage of the hand into the orthosis. Slot 33 may be combined with a fastening device, e.g. a hook and loop device 34, which also allows the position of the orthosis around the forearm to be adjusted.

According to an embodiment, the main member 30 comprises a pocket in which are housed panels 32a, 32b linked together by one or more hinges. The panels 32a, 32b are shaped to follow the base of the palm of the hand, the metacarpal region of the thumb, the palmar surface of the wrist, and part of the forearm, rising on the lateral surfaces of the hand, wrist and forearm. Panels 32a, 32b are also shaped to avoid contact with the carpal tunnel region of the palmar surface of the wrist, which can be sensitive, especially in the case of carpal tunnel syndrome.

The main member 30 is made of elastic material and is adjusted to the shape of the hand and thumb to be held, without exerting too much restraining force, which can cause pain, especially in the sensitive area of the carpometacarpal joints. The main member 30 can thus be made of the same material as member 10 (FIG. 1). The orthosis also includes a non-elastic bracing device 35, which is arranged to tighten the main member 30 around the wrist and forearm.

FIG. 13 shows an exemplary embodiment of a bracing device 35 for orthosis 3. The bracing device 35 comprises a substantially rectangular main member. This main member may be provided with an opening 38 to avoid covering the region of the styloid, which is more sensitive due to its prominence. Opening 38 may also be used as a marker to facilitate the positioning of the bracing device around the wrist. The side edges of this main member are extended on one side by strap portions 35a, 35b, and on the other side by strap portions whose ends have tightening buckles 37a, 37b designed to cooperate with strap portions 35a, 35b. The strap portions 35a, 35b may be of different widths. One side of the bracing device 35 may have a section with loops designed to cooperate with sections with hooks 36a, 36b arranged, for example, at the free ends of strap portions 35a, 35b, to secure the device 35 around the orthosis 3. The bracing device 35 may be attached to the main member 30 for example along the slot 33, by means of a seam 35d formed between the opening 38 and the tightening buckles 37a, 37b.

To tighten the bracing device 35 around the wrist, the ends of the strap portions 35a, 35b are engaged in their respective tightening buckles 37a, 37b after being wound in one direction around the wrist. The strap portions 35a, 35b are then tightened around the wrist in the other direction, the hook sections 36a, 36b at the free ends of the strap portions 35a, 35b being applied to the loop section of the bracing device 35. The orthosis can be removed in the direction of the fingertips and thumb without great effort, in particular thanks to the slot 33 which eliminates the constriction zone around the wrist.

FIG. 14 shows another exemplary embodiment of the bracing device for orthosis 3, comprising a strap 35c. One end of strap 35c is attached to the main member 30 of orthosis 3, for example to an area covering the dorsal side of the hand. To tighten the strap 35c around the wrist, the strap 35c is wound in one direction around the hand and then engaged in a tightening buckle 37c attached, for instance, to the main member 30 on the area covering the dorsal side of the wrist. The strap 35c is then tightened around the wrist in the other direction, the free end of the strap 35c being provided with a hook section 36c for cooperation with a loop section 31 attached to the main member 30 in the region of the forearm. This manner of winding the tightening strap 35c, which has a width of the order of 3 cm (to within ±20%), makes it possible to cover a larger surface area than the product of the number of turns of the strap by the width of the strap. It can also be observed that this manner of winding does not cover the styloid.

A rib 35d may be attached between two layers of fabric between the end of strap 35c attached to the main member 30 and the area where the buckle 37c is attached to the main member. The rib 35d helps to stiffen that area of the main member 30 which is subjected to forces from opposite directions when the strap 35c is tightened. It can be observed that the rib 35d is not covered by strap 35c, and therefore cannot be tightened between the dorsal face of the hand and the strap, and is positioned on the dorsal face of the hand which is not deformed by any movement of the hand or fingers. As a result, the rib does not participate in stiffening the orthosis in addition to panels 32a, 32b.

FIG. 15 shows the outer surface of panels 32a, 32b linked together by a hinge 34. Panels 32a, 32b together have an enveloping shape surrounding more than 50% of the circumference of the hand, wrist and forearm. This enveloping shape has a depth (dimension "a" in FIG. 2) which contributes to increasing the quadratic moment of the panels, and thus, by beam effect, to increasing the rigidity of the panels for supporting the weight of the hand.

As shown in FIG. 16, a portion of panels 32a, 32b is located under strap 35. Panels 32a, 32b thus act as cantilever beams 39 extending between the bracing device 35, 35c and the distal end of the metacarpal of the thumb, when the strap 35, 35c is tightened around the wrist, with the tightening of the portions of panels 32a, 32b covered by the strap 35, 35c producing a cantilever effect. This cantilever effect is increased by the fact that the strap is not elastic. Thus, the enveloping shape of panels 32a, 32b, combined with the rigidity of the material chosen to form the panels, allows the wrist to be maintained in a resting position, whatever the orientation of the hand in space, without however preventing voluntary wrist movements. The rigidity of the material forming the panels 32a, 32b is chosen so as to prevent involuntary movements of the wrist joint from the neutral rest position of the hand, due to the weight of the hand, whatever the orientation of the hand in space, without however preventing voluntary movements of the hand.

It can be observed that part of the hinge 34 is covered by the tightening strap 35, 35c, which contributes to the rigidity of the orthosis 3. It can also be observed that the hinge 34 extends only over part of the facing edges of the two panels 32a, 32b. Thus, the hinge 34 is at distances d1 and d2 from the distal and proximal edges of panel 32a. The distance d2 (FIG. 15) is set to allow the orthosis to adapt to the different morphologies of the forearm region. This arrangement combined with the flexibility of panels 32a, 32b allows the same panels to be used for different sizes of the orthosis 3, thus allowing the use of one mold for the manufacture of orthoses of different sizes. A seam between members 10 and 11 forming the pocket can be sewn into either of the slots without hinge between panels 32a, 32b.

The presence of the hinge 34 connecting the two panels 32a, 32b in the area d3 makes it possible to form a deeper combined profile (dimension "a" in FIG. 2), the depth of which is increased by tightening the strap. The quadratic moment obtained by the combination of the two panels is therefore much higher in this zone. It can be observed that this zone covers the region of the carpal tunnel where contact with the orthosis is sought to be avoided and therefore where the orthosis should have a higher stiffness. Due to the stiffness of the panels conferred by their quadratic moment, the panels can be formed with a reduced thickness.

According to an exemplary embodiment, the distance d2 between the hinge 34 and the proximal edge of the panel 32a is set to a value between 65 and 75 mm, the length d3 of the hinge 34 is set to a value between 65 and 75 mm, and the distance d1 between the hinge and the distal edge of the panel 32a is set to a value between 5 and 10 mm.

According to another embodiment, panels 32a, 32b are not articulated to each other, but are housed in two separate pockets or a single pocket divided in two, for example by a separating seam between the two panels.

Another embodiment relates to a wrist and thumb orthosis that can combine the shapes of orthoses 2 and 3, using a bracing device such as the bracing devices 35 and 35c provided for orthosis 3. FIG. 17 shows the outer surface of panels 42a, 42b which can be fitted to such a wrist and thumb orthosis. The panels 42a, 42b may be obtained by combining respectively panel 32a with panel 22a, and panel 32b with panel 22b. The two panels 42a, 42b are connected to each other by a hinge 44 having a length d3. The hinge is located at a distance d1 from the distal edge of panel 42a, and at a distance d2 from the proximal edge of panel 42a.

FIG. 18 shows a wrist and thumb orthosis 4, fitted with the panels 42a, 42b, and tightened around the hand and wrist with the bracing device 35. Of course, strap 35c may also be used to tighten orthosis 4 around the wrist. The panels 42a, 42b behave as cantilever beams 49 extending between the bracing device 35, 35c and the first phalanx of the thumb, when the bracing device 35, 35c is tightened around the wrist, the tightening of part of the panels 42a, 42b by the bracing device 35, 35c producing a cantilever effect. This cantilever effect is increased by the fact that the bracing device 35, 35c is not elastic. Thus, the enveloping shape of the panels 42a, 42b, combined with the rigidity of the material chosen for the panels, allows the wrist and thumb to be maintained in their respective rest positions, regardless of the orientation of the hand in space, without however preventing voluntary movements of the thumb and wrist, from their respective neutral rest positions that depend on the weights of thumb and hand.

It can be observed that part of hinge 44 is covered by the bracing device 35, 35c, which contributes to the rigidity of orthosis 4. It can also be observed that hinge 44 extends only over part of the facing edges of the two panels 42a, 42b. Thus, hinge 44 is at distances d1 and d2 from the distal and proximal edges of panel 42a. The distances d1 and d2 (FIG. 17) are set to allow the orthosis to adapt to the different morphologies of the thumb and forearm region. This arrangement combined with the compliance of the panels 42a, 42b allows the same panels to be used for different sizes of the orthosis 4, thus allowing the use of a single mold for the manufacture of orthoses of different sizes. A seam between members 10 and 11 forming the pocket can be formed in the slots on either end of the hinge between panels 42a, 42b.

According to an exemplary embodiment, the distance d2 between the hinge 44 and the proximal edge of the panel 42a is set to a value between 65 and 75 mm, the length d3 of the hinge 44 is set to a value between 45 and 55 mm, and the distance d1 between the hinge and the distal edge of the panel 32a is set to a value between 45 and 55 mm.

According to another embodiment, panels 42a, 42b are not articulated to each other, but are housed in two separate pockets or a single pocket divided in two, for example by a separating seam between the two panels.

It can be observed on the orthoses of FIGS. 7, 8, 10, 11, 12, 14, 16 and 18 that the panels extend over more than 85% of the length of the orthosis along the limb or joint and envelop the joint over more than 30% (preferably 50%) of the perimeter of the cross-section of the joint. The rigidity of the orthosis in the direction of flexion of the joint is defined by the elasticity of the material forming the panels and the thickness of the panels, by the more or less enveloping shape of the panels, by the presence of a hinge, and by the rigidity of the cantilever of the panels produced by the bracing device. It may be noted that the cantilever beam effect occurs not only because of the rigidity of the bracing device but also because the bracing device does not cover the distal portion of the panels.

It can also be observed that the fabric forming the orthosis also contributes to the rigidity of the orthosis, but with an order of magnitude lower than that of the panels.

In order to take into account variations in morphology from one person to another, it may be provided to manufacture each type of orthosis described above in several sizes, for example 3 or 4 different sizes. Bearing in mind that the weight of the hand represents approximately 0.5 to 0.7% of the weight of the human body, whatever the morphology, the maximum weight to be supported for each size of orthosis may be perfectly identified. The stiffness to be provided for the panel can therefore be determined for each of the different sizes of orthosis, taking into account the quadratic moment conferred by the panel due to its elongated and enveloping shape and the cantilever beam effect obtained by the bracing device acting only in the proximal and possibly central region of the orthosis. The fact that the bracing device does not act on the distal portion of the orthosis provides the joint with a certain freedom of movement, particularly in directions not hindered by the panel (from the convex face to the concave face of the panel).

It will be clear to a person skilled in the art that the present invention is susceptible of various alternatives and various applications. In particular, depending on the morphology of the region of the covered limb, the orthosis may comprise a single panel formed in a single part without a hinge. It may also not be necessary to mold the panel to the shape of the limb to be covered. Depending on the joint and pathology to be relieved, it may be sufficient to select a panel made of a material flexible enough to naturally conform to the shape of the covered limb, under the effect of the tightening action of the element 10 of the orthosis and the bracing device.

It is also not necessary to form element 10 of the main member 20, 30, 40 with two layers of elastic fabric glued together. Other materials may be easily found that provide sufficient rigidity to the main member of the orthosis. In addition, materials other than fabric may be used to make the sleeve and pocket, such as microporous films or membranes joined together by welding.

According to an embodiment, a method of making an orthosis includes forming a sleeve-like main member of an elastic material, and adapted to envelop a joint and distal and proximal limb portions on either side of the joint, the main member having an opening for passage of a proximal limb portion and an opening for passage of a distal limb portion. The method includes forming an elastically deformable panel housed in a pocket formed in the main member and adjusted to dimensions of the panel, a distal portion of the panel being held around the limb only by the main member, the panel being shaped so that, over a region of at least 50% of a length of the main member along the limb portions, the panel has a cross-section occupying more than 30% of a perimeter of an underlying limb. The method includes forming a rigid bracing device for bracing the main member in said region of at least 50% of the length of the main member and bracing a proximal portion of the panel around the proximal limb portion, and wherein the panel being made of a material having a Young's modulus between 5 and 10 MPa, while the material forming the main member has a rigidity of a lower order of magnitude.

In one embodiment, forming an elastically deformable panel comprises forming two panel parts joined together by a hinge extending along part of facing edges of the two panel parts.

In one embodiment, the hinge is made during manufacture of the panel from the same material as the panel or is formed by stitches.

In one embodiment, the panel is made by one of injection molding, thermoforming of a sheet using a hot press, or 3D printing.

The invention claimed is:

1. An orthosis for supporting a joint, adapted to a thumb and/or a wrist, the orthosis comprising:

a sleeve of an elastic material, and adapted to envelop the joint and distal and proximal limb portions of a limb on either side of the joint, the sleeve having an opening for passage of the proximal limb portion and an opening for passage of the distal limb portion, an elastically deformable panel housed in a pocket of the sleeve and adjusted to dimensions of the elastically deformable panel, the elastically deformable panel comprising a proximal portion adapted to be held around the proximal limb portion, and a distal portion adapted to be held around the limb only by the sleeve, wherein the elastically deformable panel is configured so that, in use over a region of at least 50% of a length of the sleeve along the distal and proximal limb portions, the elastically deformable panel has a cross-section adapted to occupy more than 30% of a perimeter of the limb, and comprising a non-elastic tightening device for bracing the sleeve in said region of at least 50% of the length of the sleeve and bracing the proximal portion of the elastically deformable panel around the proximal limb portion, while said distal portion of the elastically deformable panel is held around the limb only by the sleeve, the elastically deformable panel being made of a material having a Young's modulus between 5 and 10 MPa, while the elastic material forming the sleeve has a rigidity of a lower order of magnitude, and wherein the orthosis is configured so that, when the non-elastic tightening device is tightened around the proximal limb portion, the resulting bracing of the proximal portion of the elastically deformable panel by the non-elastic tightening device while said distal portion of the elastically deformable panel is held around the limb only by the sleeve and is not held around the limb by the non-elastic tightening device, causes the elastically deformable panel to behave like a cantilever beam preventing involuntary movements of the limb from a neutral resting position, without preventing voluntary movements of the limb based on the elastic deformation of the elastically deformable panel which is enabled by the Young's modulus of between 5 and 10 MPa of the material of which it is made.

2. The orthosis according to claim 1, wherein an extent and thickness of the elastically deformable panel, and an elasticity of the elastically deformable panel and the sleeve are selected so as to prevent unintentional movements of the limb from a neutral rest position due to a weight of the distal limb portion.

3. The orthosis according to claim 1, wherein the elastically deformable panel is adapted to extend over at least 80% of a length of the orthosis along the limb, and the cross-section of the elastically deformable panel is adapted to occupy more than 40% of the perimeter of the limb over at least 80% of a length of the elastically deformable panel along the limb.

4. The orthosis according to claim 1, wherein the elastically deformable panel comprises two panel parts joined together by a hinge extending along part of facing edges of the two panel parts.

5. The orthosis according to claim 4, wherein the hinge is made from the same material as the elastically deformable panel or is formed by stitches.

6. The orthosis according to claim 4, wherein the hinge extends over less than half of a length of the facing edges of the two panel parts.

7. The orthosis according to claim 4, in which the non-elastic tightening device partly covers the hinge.

8. The orthosis according to claim 1, comprising a further elastically deformable panel housed in a further pocket which is distinct and contiguous to said pocket housing the said elastically deformable panel.

9. The orthosis according to claim 1, wherein the sleeve is made of fabric including two elastic fabric layers joined together by an adhesive layer, said pocket being formed by means of an elastic fabric layer sewn onto an inner side of the sleeve.

10. The orthosis according to claim 1, wherein the elastically deformable panel is made of an elastic material with a Young's modulus between 5.4 and 9 MPa and has a thickness between 0.8 and 1.9 mm.

11. The orthosis according to claim 1, adapted to support the thumb, wherein the sleeve includes a distal sleeve part shaped to cover a base of the thumb, a proximal sleeve part shaped to cover the wrist, and an intermediate part connecting the distal and proximal parts, the elastically deformable panel comprising two panel parts shaped to conform to the shape of the thumb, a first phalanx and a first metacarpal of the thumb, up to the wrist, without covering a palmar area of the wrist, the non-elastic tightening device comprising a strap attached to the sleeve and configured to be tightened around the wrist.

12. The orthosis according to claim 1, adapted to support the wrist, wherein the sleeve is shaped to cover a portion of a forearm, the wrist and carpo-metacarpal joints of the thumb and a proximal portion of the metacarpals of fingers, the sleeve having a proximal opening for passage of the forearm forming the said opening for passage of the proximal limb portion and two distal openings forming together said opening for passage of the distal limb portion, one of said two distal opening for passage of the thumb, and one other of said two distal openings for passage of a palm of a hand, the elastically deformable panel comprising two panel parts shaped to conform to a base of the palm of the hand, a metacarpal region of the thumb, and a palmar surface of the wrist, and part of the forearm, extending up along side faces of the hand, wrist and forearm, the non-elastic tightening device being configured to brace the sleeve around the wrist and forearm.

13. The orthosis according to claim 1, adapted to support the wrist and thumb, wherein the sleeve includes a distal sleeve part shaped to cover a base of the thumb, a proximal sleeve part shaped to cover the wrist and part of a forearm and carpo-metacarpal joints of the thumb, and an intermediate part connecting the distal and proximal parts, the elastically deformable panel including two panel parts shaped to conform to the shape of the thumb, a first phalanx and the region of a first metacarpal of the thumb, a base of a palm of a hand, and a palmar surface of the wrist, and part of the forearm, extending up along side faces of the hand, wrist and forearm, the non-elastic tightening device being configured to brace the sleeve around the wrist and forearm.

14. The orthosis according to claim 12 wherein one of the two panel parts is shaped to avoid contact with a carpal tunnel region on the palmar surface of the wrist.

15. A method of making an orthosis, the method comprising:
forming a sleeve of an elastic material, and adapted to envelop a joint and distal and proximal limb portions of a limb on either side of the joint, the sleeve having an opening for passage of the proximal limb portion and an opening for passage of the distal limb portion, forming an elastically deformable panel housed in a pocket of the sleeve and adjusted to dimensions of the elastically deformable panel, a distal portion of the elastically deformable panel being adapted to be held around the limb only by the sleeve,
the elastically deformable panel being shaped so that, in use, over a region of at least 50% of a length of the sleeve along the distal and proximal limb portions, the elastically deformable panel has a cross-section adapted to occupy more than 30% of a perimeter of the limb,
and comprising forming a non-elastic tightening device for bracing the sleeve in said region of at least 50% of the length of the sleeve and bracing a proximal portion of the elastically deformable panel around the proximal limb portion while said distal portion of the elastically deformable panel is held around the limb only by the sleeve, and
wherein the elastically deformable panel being made of a material having a Young's modulus between 5 and 10 MPa, while the elastic material forming the sleeve has a rigidity of a lower order of magnitude,
and comprising configuring the orthosis so that, when the non-elastic tightening device is tightened around the proximal limb portion, the resulting bracing of the proximal portion of the elastically deformable panel by the non-elastic tightening device while said distal portion of the elastically deformable panel is held around the limb only by the sleeve and is not held around the limb by the non-elastic tightening device, causes the elastically deformable panel to behave like a cantilever beam preventing involuntary movements of the limb from a neutral resting position, without preventing voluntary movements of the limb based on the elastic deformation of the elastically deformable panel which is enabled by the Young's modulus of between 5 and 10 MPa of the material of which it is made.

16. The method of claim 15, wherein said forming an elastically deformable panel comprises forming two panel parts joined together by a hinge extending along part of facing edges of the two panel parts.

17. The method of claim 16, wherein the hinge is made during manufacture of the elastically deformable panel from the same material as the elastically deformable panel or is formed by stitches.

18. The method of claim 15, wherein the elastically deformable panel is made by one of injection molding, thermoforming of a sheet using a hot press, or 3D printing.

* * * * *